United States Patent [19]
Walker

[11] Patent Number: 5,348,179
[45] Date of Patent: Sep. 20, 1994

[54] VENTING CAP ASSEMBLY

[75] Inventor: Lynn M. Walker, Leesburg, Fla.

[73] Assignee: Walker Stainless Equipment Company, Inc., Tavares, Fla.

[21] Appl. No.: 881,347

[22] Filed: May 11, 1992

[51] Int. Cl.5 .............................................. B65D 51/16
[52] U.S. Cl. .................................... 220/209; 220/363; 220/373; 220/89.1; 220/DIG. 27; 137/498; 137/517; 137/859
[58] Field of Search ................ 220/367, 373, 374, 361, 220/363, 202, 203, 209, 89.1, 747, 748, DIG. 27; 215/260, 261, 307, 311, 315; 137/498, 517, 859

[56] References Cited

U.S. PATENT DOCUMENTS

| | | | |
|---|---|---|---|
| 1,808,702 | 6/1931 | Williams | 215/260 |
| 2,298,938 | 10/1942 | Griffin, Jr. et al. | |
| 2,427,525 | 9/1947 | Glanzer | 137/859 X |
| 2,462,189 | 2/1949 | Hess | 137/859 X |
| 2,497,906 | 2/1950 | Peters et al. | 137/859 X |
| 2,674,262 | 4/1954 | Bradshaw | 137/859 X |
| 3,072,284 | 1/1963 | Luhman, Jr. | 220/374 |
| 3,179,122 | 4/1965 | Wasdell | 220/209 X |
| 3,351,497 | 11/1967 | Lucas | |
| 3,391,818 | 7/1968 | Hairston | |
| 3,508,576 | 4/1970 | Gross | 137/859 |
| 3,927,798 | 12/1975 | Loomis | |
| 4,081,107 | 3/1978 | Martin, Jr. et al. | |
| 4,127,216 | 11/1978 | Martin, Jr. et al. | |
| 4,315,579 | 2/1982 | Martin, Jr. | |
| 4,541,544 | 9/1985 | Martin, Jr. et al. | |
| 4,624,286 | 11/1986 | Frohn | |
| 4,672,996 | 6/1987 | Floyd et al. | 220/209 X |
| 4,712,583 | 12/1987 | Pelmulder | 137/859 X |
| 4,819,830 | 4/1989 | Schultz | |
| 4,877,624 | 10/1989 | Floyd et al. | 220/207 X |

Primary Examiner—Allan N. Shoap
Assistant Examiner—Stephen Cronin
Attorney, Agent, or Firm—James H. Beusse

[57] ABSTRACT

A capping assembly for attachment to a ferrule of a manhole assembly in a tanker truck having a cap which is provided with a central aperture for venting. The cap is further provided with threads for accommodating the threads of the ferrule. A diaphragm having a flexible central member larger than the aperture of the cap and peripheral apertures is fittably connectable to the ferrule and positionable between the cap and the opening of the ferrule. The diaphragm includes an outer circumferential beveled surface for seatingly engaging a beveled upper inner surface of the ferrule.

1 Claim, 1 Drawing Sheet

VENTING CAP ASSEMBLY

BACKGROUND OF THE INVENTION

The present invention relates to vent cap assemblies for liquid transport tanks and, more particularly, to a vent cap assembly which minimizes leakage but allows venting of the liquid holding tank of a tanker truck.

The prior art has exhibited numerous types of caps for tank trucks which seal the contents of a tanker truck. For certain types of cargoes, for example in hauling juices, milk and the like, it is desirable that a cap not only prevent leakage of the contents, but provide venting of the liquid holding container of the tank truck. Certain types of caps have been designed to relieve internal pressure inside of a holding container when the pressure exceeds a predetermined level. For example, a cap having a venting aperture can be sealed by a spring loaded member which exposes the venting aperture to a venting flow path when the internal pressure of the tank exceeds the spring force exerted on the cap. (See U.S. Pat. No. 3,927,798.) Degassifying valves for relieving pressure of tankers containing dangerous or combustible liquids have also used spring-loaded sealing mechanisms. (See U.S. Pat. No. 4,624,286.)

In the liquid food transport industry, it is desirable that the liquid container of a transport vehicle be allowed to breathe while preventing leakage of the contents. Leakage or spillage can occur from sloshing on rough roads or when making turns if means are not provided to retain the liquid in the container. One concept which has been demonstrated is that of a venting member which is to be inserted into an access opening of a transport tank. The venting member is provided with horizontally extending baffles which are braced by a center rod and which are vertically spaced from one another in a staggered, overlapping relationship to allow an airflow path to extend from interior of the liquid holding tank to the exterior of the tank truck. (See U.S. Pat. Nos. 4,127,216 and 4,081,107.)

As shown in the above noted patents, the trend in the industry is toward more complicated devices requiring time-consuming maintenance for keeping the sealing and venting devices clean, which of course is desirable in the liquid food hauling industry. Therefore, a need is seen for a simple and effective sealing and venting device which is easily maintained and cleaned.

SUMMARY OF THE INVENTION

Accordingly, one object of the present invention is to provide a cap assembly for a liquid food container which will minimize spillage and allow for venting.

Yet another object of the present invention is to provide a cap assembly which is simple and easily cleaned and maintained.

Still another object of the present invention is to provide a cap assembly which is easily manufactured and low in cost.

These and other valuable objects and advantages of the present invention are provided by a capping assembly for attachment to a ferrule of a container assembly such as that on a milk truck or liquid food transport truck. The cap assembly includes a cap having a central aperture for venting and a flexible diaphragm for sealing. In an illustrative embodiment, the cap is threaded to enable it to be secured to a threaded ferrule extending from an outer surface of a liquid transport tank. The diaphragm has a flexible central member which is larger than the aperture of the cap and at least one peripheral aperture forming a vent through the diaphragm. The diaphragm is formed with an outer circumferential beveled surface adapted for mating engagement with a corresponding inner beveled upper surface on a tank ferrule for providing both a positive seal and a seating arrangement which prevents movement of the diaphragm. In an assembled position, the cap compresses the outer periphery of the diaphragm against the ferrule with the central flexible member overlaying the aperture in the cap. When splashing or surging of a liquid within the tank occurs, the flexible central member is urged against the cap blocking the aperture and minimizes leakage therethrough. Otherwise, the central aperture of the cap and the at least one peripheral aperture of the diaphragm provide a venting path to prevent differential pressure build-up in the tank.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

When referring to the drawings, it should be understood that like reference numerals designate identical or corresponding parts throughout the respective figures.

THE DETAILED DESCRIPTION OF THE INVENTION

Figure 1:
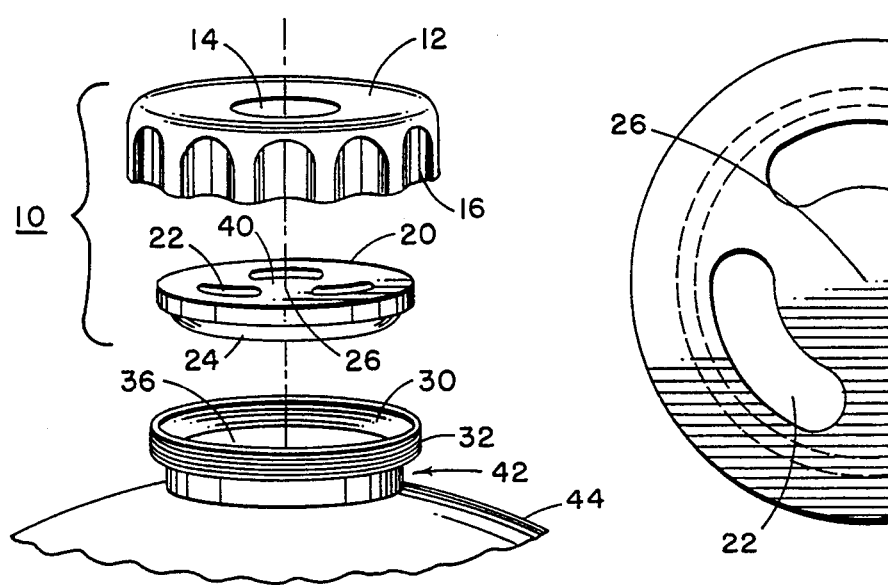
FIG. 1 is an exploded view of the cap assembly of the present invention.

With reference to FIG. 1, a cap assembly 10 according to the present invention includes a cap 12 having a central aperture 14. The cap 12 is equipped with outer peripheral ridges 16 to allow for ease in gripping for securing and removing the cap 12. Cap 12 is preferably made of plastic or other suitable FDA approved material which is light in weight and durable. The assembly 10 further includes a diaphragm 20 having circumferentially spaced peripheral apertures 22. Preferably, three such peripheral apertures 22 are equally distributed about a flexible central section or member 26. Diaphragm 20 is made of molded rubber or other appropriate FDA approved material. The outer circumferential surface of diaphragm 20 is formed with a partial beveled surface 24 adapted for mating with beveled inner surface 30 of ferrule 32. The outer diameter of diaphragm 20 is selected to be sufficiently large as to prevent diaphragm 20 from falling through the opening 34 in ferrule 32. The ferrule 32 is provided with outer circumferential threads 36 for accommodating and engaging threads 18 of cap 12 (see FIG. 2). As is well known, ferrule 32 is a part of manhole assembly 42 providing access to liquid container or tank 44.

Figure 2:
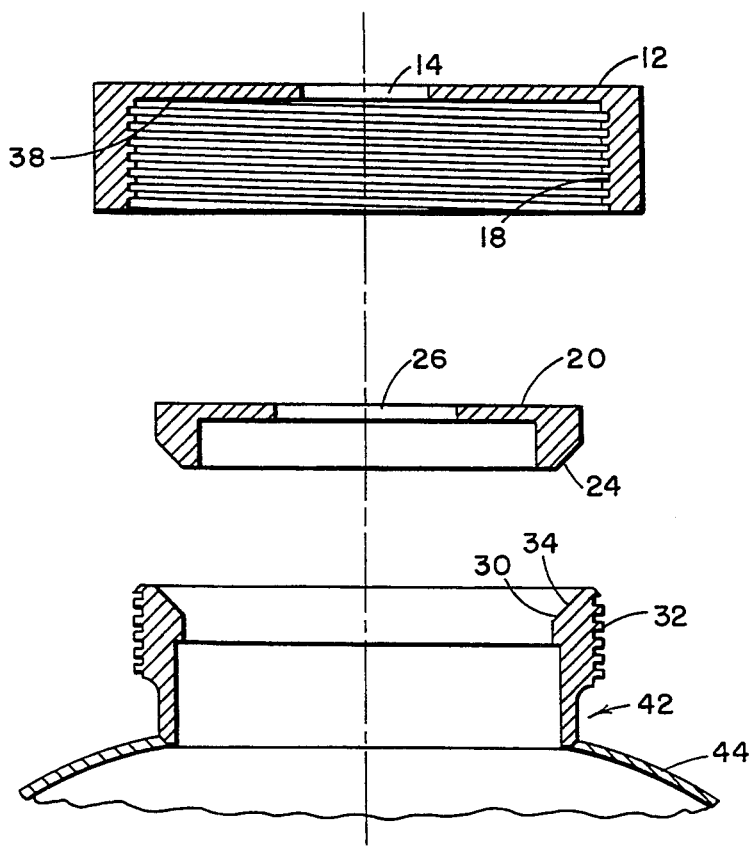
FIG. 2 is an exploded cross-sectional illustration of the cap assembly of the present invention.

The exploded cross-sectional illustration of FIG. 2 reveals threads 18 of cap 12 which allow cap 12 to be secured to the threads 36 of ferrule 32. The flexible central member 26 of diaphragm 20 is sensitive to pressure forces and has a surface area larger than the central aperture 14 of the cap 12. The beveled upper inner surface 30 of ferrule 32 mates with surface 24 of diaphragm 20 for seatingly engaging the diaphragm. In an assembled position, the surface of diaphragm 20, including member 26, is located adjacent inner surface 38 of cap 12.

Figure 3:
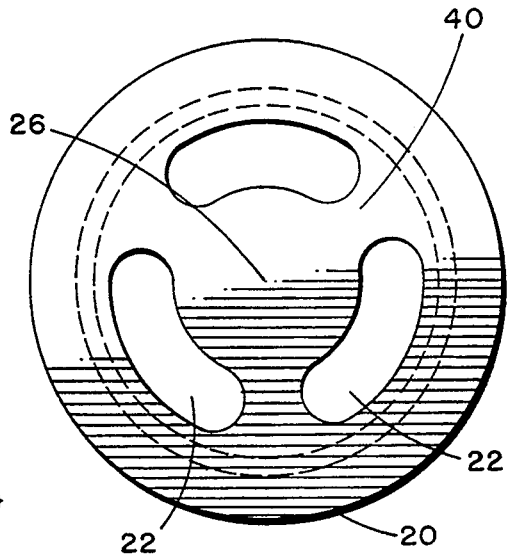
FIG. 3 is a top view of the diaphragm of the cap assembly of the present invention.

Turning to top plan view of FIG. 3, the peripheral apertures 22 of diaphragm 20 are preferably equally spread about the circumference of member 26. Each of the apertures 22 are formed as elongated, arcuate slots defining narrow flexible supporting strips 40 for member 26. The strips 40 allow the member 26 to flex with respect to the aperture 14 in cap 12.

The cap assembly 10 of the present invention is easily secured to and removed from ferrule 32. The cap assembly is removed during loading and unloading of the liquid container 44 and during those times when it is necessary to clean the liquid container 44 and the cap assembly 10. The simple construction of the cap assembly enables it to be easily cleaned.

To secure the present invention to ferrule 32, the diaphragm 20 is aligned over large aperture 34 of ferrule 32. The circumferential beveled surface 24 of the diaphragm 20 is seatingly engaged with the beveled upper inner surface 30 of ferrule 32. The circumferential beveled surface 24 of diaphragm 20 allows the diaphragm to seat securely on ferrule 32 while having an outer diameter larger than an inner diameter of ferrule 32 and makes it impossible for the diaphragm to fall through the large aperture 34 of the ferrule 32 and into the liquid container 44.

When movement of the liquid container 44 causes the liquid inside it to surge so as to be forced against the flexible central member 26 of the diaphragm 20, the flexible central member is forced up against the interior upper surface 38 (FIG. 2) of the cap 12 and generally seals the central aperture 14 so spillage of liquid is minimized. When vacuum conditions exists, i.e., when the pressure inside of the liquid container 44 is less than the outside air pressure, air is vented through the central aperture 14, through the peripheral apertures 22 of diaphragm 20, through large aperture 34 of ferrule 32 and into the liquid container 44. When the pressure inside of the liquid container 44 is slightly greater than the outside air pressure, air is vented from the liquid container 44, through the peripheral apertures 22, and through the central aperture 14 of the cap 12.

When not exposed to surge forces, the diaphragm 20 fits within cap 12 such that an air space exists between the flexible central member 26 of the diaphragm 20 and the interior upper surface 38 of the cap 12. Thus, the cap assembly of the present invention allows for venting during transport.

The present invention is user friendly in that the cap assembly is easily secured and removed by hand and provides a durable, low cost, and effective spillage minimizing and venting apparatus.

The foregoing detailed description is intended to be illustrative and non-limiting. Many changes and modifications are possible in light of the above teachings. Thus, it is understood that the invention may be practiced otherwise than as specifically described herein and still be within the scope of the appended claims.

What is claimed is:

1. A vent cap assembly for attachment to a ferrule of a manhole assembly on a liquid holding tank in a tanker truck, said cap assembly comprising:

a cap having a central air vent aperture for venting air and including first securing means for securing the cap to the ferrule;

a diaphragm having a flexible non-porous central sealing member larger than said aperture in said cap, said diaphragm having an outer circumferential band foraged integrally therewith, said band having a generally rectangular cross-section substantially thicker than said central member, a radially outer corner of said band having a seating surface for mating with a corresponding beveled surface on a ferrule extending from a liquid holding tank to center said diaphragm on the ferrule, said diaphragm further including a plurality of circumferentially spaced supporting strips extending between said band and said central sealing member for supporting said central member in a generally planar orientation within said band, said diaphragm further including a plurality, of air passageway apertures situated between said supporting strips for passing air through said diaphragm, said diaphragm being substantially flat when pressure inside said tank is less than or equal to air pressure outside said tank such that air vents freely from inside said tank through the air passageway apertures in said diaphragm and the air vent aperture in said cap, said diaphragm dishing toward said cap and assuming a substantially convex shape such that the central sealing member of said diaphragm seals with said central aperture to minimize liquid spillage through said cap when a liquid in said tank sloshes against said diaphragm, and second securing means in said cap for securing said diaphragm on the ferrule when said cap is secured to the ferrule.

* * * * *